United States Patent
Paul

(10) Patent No.: US 10,630,581 B2
(45) Date of Patent: Apr. 21, 2020

(54) DYNAMIC TUNNEL REPORT FOR PATH COMPUTATION AND TRAFFIC ENGINEERING WITHIN A COMPUTER NETWORK

(71) Applicant: Juniper Networks, Inc., Sunnyvale, CA (US)

(72) Inventor: Arijit Paul, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/012,524

(22) Filed: Jun. 19, 2018

(65) Prior Publication Data
US 2019/0386915 A1    Dec. 19, 2019

(51) Int. Cl.
*H04L 12/723*    (2013.01)
*H04L 12/715*    (2013.01)
*H04L 12/46*    (2006.01)
*H04L 12/717*    (2013.01)

(52) U.S. Cl.
CPC .......... *H04L 45/50* (2013.01); *H04L 12/4633* (2013.01); *H04L 45/64* (2013.01); *H04L 45/42* (2013.01)

(58) Field of Classification Search
CPC ..... H04L 45/50; H04L 12/4633; H04L 45/64; H04L 45/42
See application file for complete search history.

(56) References Cited

U.S. PATENT DOCUMENTS 8,339,959 B1    12/2012  Moisand et al.
8,750,288 B2     6/2014  Nakil et al.
9,178,796 B2    11/2015  Previdi et al.
(Continued)

FOREIGN PATENT DOCUMENTS

WO    2013184846 A1    12/2013

OTHER PUBLICATIONS

Page from "Release Notes: Junos® OS Release 17.4R1 for the ACX Series, EX Series, MX Series, NFX Series, PTX Series, QFX Series, SRX Series, and Junos Fusion," Juniper Networks, Inc., https://www.juniper.net/documentation/en_US/junos/information-products/topic-collections/release-notes/17.4/junos-release-notes-17.4.pdf, May 17, 2018.
(Continued)

*Primary Examiner* — Walter J Divito
(74) *Attorney, Agent, or Firm* — Shumaker & Sieffert, P.A.

(57) ABSTRACT

In general, techniques are described for reporting dynamic tunnels to a path computation element (PCE) of a network to inform path computation by the PCE for traffic engineering within the network. In some examples, a method comprises generating, by a network device configured to route network packets within a network, a dynamic tunnel report message that includes dynamic tunnel description data for a dynamic tunnel that transports the network packets through the network, wherein the network packets transported by the dynamic tunnel each comprises an outer header that does not include a multiprotocol label switching (MPLS) transport label; and sending, by the network device, the dynamic tunnel report message to a path computation element (PCE) for a path computation domain to report the dynamic tunnel to the PCE for inclusion in path computation by the PCE for label switched paths of the network.

21 Claims, 6 Drawing Sheets

(56) References Cited

U.S. PATENT DOCUMENTS

| | | |
|---|---|---|
| 9,450,817 B1 | 9/2016 | Bahadur et al. |
| 9,794,165 B1 | 10/2017 | Wood |
| 2015/0003283 A1* | 1/2015 | Previdi .................. H04L 41/12 370/254 |
| 2017/0012895 A1 | 1/2017 | Zhao et al. |
| 2018/0102919 A1* | 4/2018 | Hao .................... H04L 12/4633 |

OTHER PUBLICATIONS

"Junos® OS Layer 3 VPNs Feature Guide for Routing Devices," Juniper Networks, Inc., https://www.juniper.net/documentation/en_US/junos/information-products/pathway-pages/config-guide-vpns/config-guide-vpns-layer-3.pdf, Mar. 20, 2018, 384 pp.

Sethuraman, "Contrail Cloud Solution With MPLS-Over-UDP Overlays," Blog, https://tungstenfabric.io/contrail-cloud-solution-with-mpls-over-udp-overlays/, Jan. 4, 2017, 19 pp.

"Junos® OS Tunnel and Encryption Services Interfaces Feature Guide for Routing Devices," Juniper Networks, Inc., https://www.juniper.net/documentation/en_US/junos/information-products/pathway-pages/services-interfaces/encryption-properties.pdf, modified Feb. 23, 2018, 212 pp.

Rosen, "BGP/MPLS IP Virtual Private Networks (VPNs)," Network Working Group, RFC 4364, Feb. 2006, 48 pp.

Xu, "Encapsulating MPLS in UDP," Internet Engineering Task Force (IETF), RFC 7510, Apr. 2015, 20 pp.

Worster, "Encapsulating MPLS in IP or Generic Routing Encapsulation (GRE)," Network Working Group, RFC 4023, Mar. 2005, 14 pp.

Vasseur "Path Computation Element (PCE) Communication Protocol (PCEP)," Network Working Group, Request for Comment 5440, Mar. 2009, 88 pp.

Crabbe et al., "Path Computation Element Communication Protocol (PCEP) Extensions for Stateful PCE," Internet Engineering Task Force, Request for Comments 8231, Sep. 2017, 58 pp.

Awduche, "RSVP-TE: Extensions to RSVP for LSP Tunnels", Network Working Group, Request for Comments 3209, Dec. 2001, 62 pp.

Braden, "Resource ReSerVation Protocol (RSVP)," Network Working Group, Request for Comments 2205, Sep. 1997, 112 pp.

Chen et al., "PCE-initiated IP Tunnel, draft-chen-pce-pce-initiated-ip-tunnel-00", Network Working Group, Internet-Draft, Sep. 4, 2015, 23 pp.

Crabbe et al., "PCEP Extensions for PCE-initiated LSP Setup in a Stateful PCE Model, draft-crabbe-pce-pce-iniated-lsp-00", Network Working Group, Internet-Draft, Oct. 9, 2012, 14 pp.

Paul, "PCEP extension to support reporting of dynamic tunnels, draft-paul-pce-dynamic-tunnel-00" PCE, Internet-Draft, Nov. 20, 2018, 8 pp.

Extended European Search Report received in EP counterpart application No. 19180342.8 dated Sep. 23, 2019, 13 pp.

* cited by examiner

DYNAMIC TUNNEL REPORT FOR PATH COMPUTATION AND TRAFFIC ENGINEERING WITHIN A COMPUTER NETWORK

TECHNICAL FIELD

The disclosure relates to computer networking and, more specifically, to improving path computation for paths within a computer network.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction.

Traffic engineering may be applied within a network for a variety of purposes, such as to route traffic around network failures or congested links or to direct certain traffic along a particular path through the network that meets a set of explicit requirements. For example, a router within the network may establish a traffic engineering label switched path (TE LSP) in a Multi-Protocol Label Switching (MPLS) network using a resource reservation protocol, such as the Resource Reservation Protocol with Traffic Engineering extensions (RSVP-TE). Once a packet is mapped on to an Traffic Engineering LSP (TE LSP) by an ingress label edge router (LER) for the LSP, the intermediate devices along the TE LSP forward the packet based on labels attached to the packet, rather than making independent forwarding decisions based on the packet destination and the intermediate devices' routing information. A Traffic Engineering MPLS LSP may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth, direct shortest path first algorithms to compute a satisfactory path with regard to the constraint metrics. The network routers then establish an LSP that matches the computed path and, using the LSP, forward traffic in a manner that satisfies the constraints. Constrained shortest path first (CSPF) thus represents a fundamental building block for traffic engineering systems, including MPLS and Generalized MPLS (GMPLS) networks. However, constraint-based path computation in large, multi-domain, multi-region, and/or multi-layer networks is complex and may in some instances require cooperation between elements in different administrative domains that do not exchange sufficient traffic engineering information for computing multi-domain paths.

Network operators may augment path computation and traffic engineering for their networks by introducing one or more path computation elements (PCEs) that allow the network routers to offload path computation. A PCE establishes PCE communication protocol (PCEP) sessions with one or more path computation clients (PCCs) through a network. Path computation clients, such as routers, issue path computation requests to the PCE using their respective PCEP sessions. The PCE applies constraints provided in a path computation request to compute the path of a LSP through a path computation domain that satisfies the constraints. The PCE then returns the path to the requesting PCC of an ingress LER for the TE LSP, effectively augmenting the network path computation functionality. A PCE may be stateless or stateful. In general, a stateless PCE does not maintain state describing TE LSPs in the network. A stateful PCE, on the other hand, maintains state for a subset of TE LSPs in the network, allowing the stateful PCE to utilize more sophisticated LSP path computation algorithms in some instances.

SUMMARY

In general, techniques are described for reporting dynamic tunnels to a path computation element (PCE) of a network to inform path computation by the PCE for traffic engineering within the network. A network device may establish a dynamic tunnel to a tunnel destination network device as an overlay to transport virtual private network (VPN) traffic across a layer 3 network. For example, when a network device receives a VPN route to a next hop address, the network device may dynamically configure a tunnel to carry the VPN traffic for the VPN to the next hop address. According to the techniques described herein, the network device automatically reports this tunnel, known as a dynamic tunnel, to the PCE, thereby informing the PCE of the existence of the dynamic tunnel for informing future path computations by the PCE.

In some examples, a PCE communication protocol (PCEP) is extended to support dynamic tunnel report messages that includes tunnel description data for a dynamic tunnel. Example tunnel description data for a dynamic tunnel may include a tunnel identifier, a source address, a destination address, operational status, a metric, a tunnel type, and a service label. In some cases, the PCEP Path Computation State Report (PCRpt) message is extended to include a dynamic tunnel object ("Dynamic-Tunnel") that includes the tunnel description data. A path computation client (PCC), such as the network device that configured a dynamic tunnel, may generate and send a dynamic tunnel report message to advertise the dynamic tunnel to the PCE to affect the path computation and thus placement within the network of LSPs having paths computed by the PCE.

The techniques may provide one or more technical advantages. For example, by enabling reporting dynamic tunnels to the PCE, the techniques may improve the visibility of the PCE into the network. With access to additional data descriptive of tunnels configured in the network, in this case dynamic tunnels, the PCE may more intelligently configure label switched paths to transport traffic in a manner that improves the efficiency of overlays in the network. This technical advantage may be particularly advantageous within a data center context, in which many thousands of tunnels are configured to transport service traffic between nodes. In this way, the techniques may facilitate improved optimization of path computation by the PCE using the tunnel description data.

In some examples, a system comprises a software-defined networking (SDN) controller for a network, the SDN controller comprising a path computation element (PCE) for a path computation domain of a network; and a network device configured to route network packets within the network, the network device further configured to generate a dynamic tunnel report message that includes dynamic tunnel description data for a dynamic tunnel that transports the network packets through the network, wherein the network packets transported by the dynamic tunnel each comprises an outer header that does not include a multiprotocol label switching (MPLS) transport label, and wherein the network device is further configured to send the dynamic tunnel report message to the SDN controller to report the dynamic tunnel to the SDN controller, and wherein the SDN controller is configured to compute, based at least on the dynamic tunnel description data, respective paths for one or more label switched paths for transporting other network packets within the network and to send the computed paths to the network for provisioning within the network.

In some examples, a method comprises generating, by a network device configured to route network packets within a network, a dynamic tunnel report message that includes dynamic tunnel description data for a dynamic tunnel that transports the network packets through the network, wherein the network packets transported by the dynamic tunnel each comprises an outer header that does not include a multiprotocol label switching (MPLS) transport label; and sending, by the network device, the dynamic tunnel report message to a path computation element (PCE) for a path computation domain to report the dynamic tunnel to the PCE for inclusion in path computation by the PCE for label switched paths of the network.

In some examples, network device comprises one or more processors coupled to a memory; a routing protocol daemon configured for execution by the one or more processors to receive a route advertisement that includes a route for a network prefix and a service label for the route, wherein the routing protocol daemon is further configured to configure a dynamic tunnel that transports network packets through the network, the network packets including the service label for the route, the service label for identifying a service provided by the network; and a path computation client configured for execution by the one or more processors to generate, in response to configuration of the dynamic tunnel, a dynamic tunnel report message that includes dynamic tunnel description data for the dynamic tunnel, wherein the path computation client is further configured to send, via a Path Computation Element Protocol (PCEP) session with a software-defined networking (SDN) controller for the network, the dynamic tunnel report message to report the dynamic tunnel to the SDN controller.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
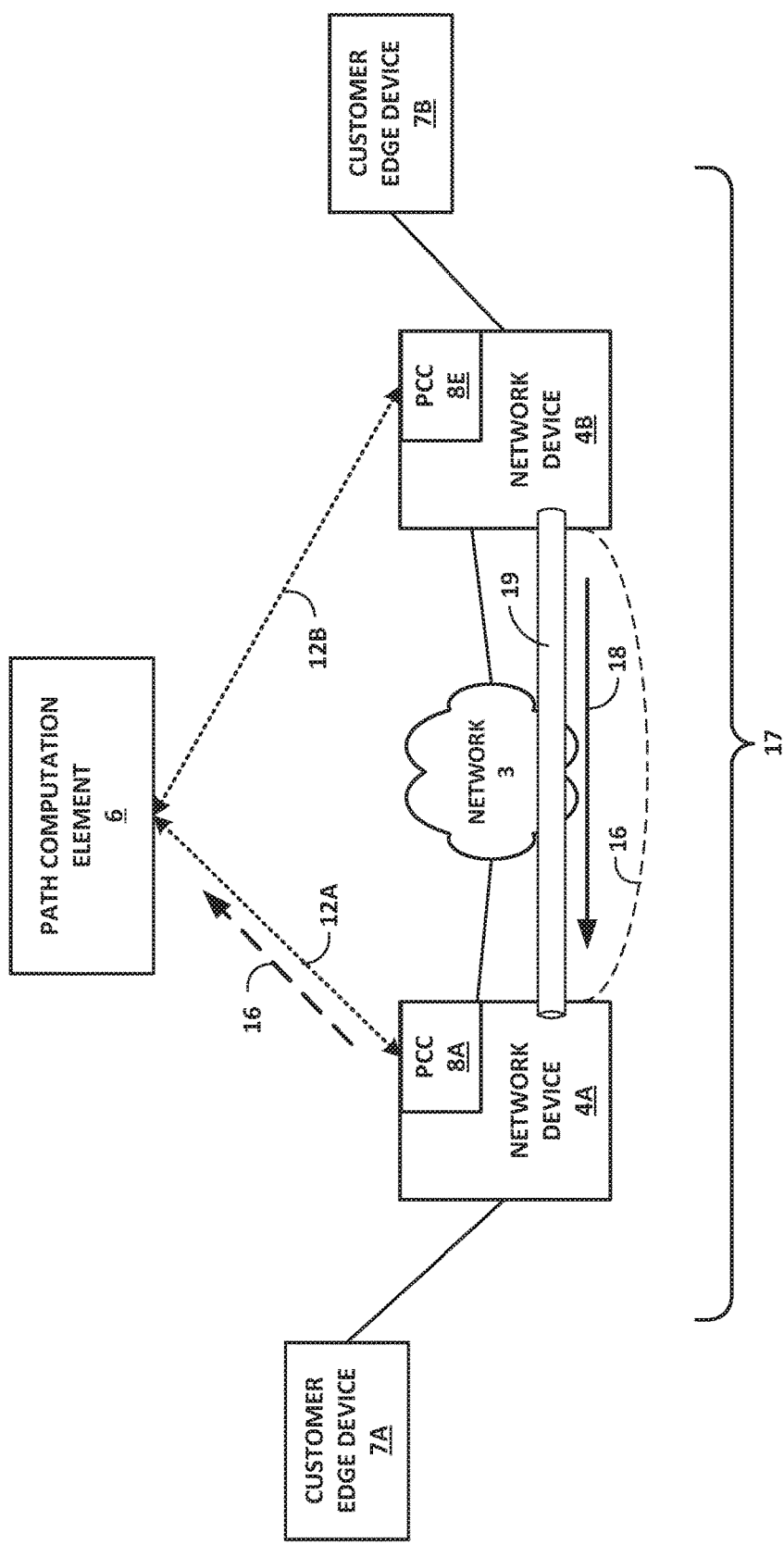
FIG. 1 is a block diagram illustrating a network system in which network devices, such as routers, report creation and removal of dynamic tunnels to one or more path computation elements of the network system, in accordance with techniques of this disclosure.

FIG. 1 is a block diagram illustrating a network system 2 in which network devices report the creation of and/or removal of dynamic tunnels within the network system 2 to a path computation element 6, in accordance with techniques of this disclosure. In this example, network system 2 includes path computation element (PCE) 6 and a plurality of network devices 4A-4B ("network devices 4") interconnected by a network 3. Network 3 may represent a layer 3 network that includes one or more provider edge (PE) devices (shown as network devices 4) that extend attachment circuits to customer edge (CE) devices 7 to provide services to customers networks attached to intermediate packet-switched network 3. In some cases, network 3 implements BGP/Multiprotocol Label Switching (BGP/MPLS) Internet Protocol (IP) Virtual Private Networks (VPNs) to segregate traffic for different customers by ensuring that routes from different VPNs remain distinct and separate, regardless of whether VPNs for respective customers have overlapping address spaces.

For each VPN configured on network devices 4 for transporting customer traffic across network 3 and in which a particular PE router 4 participates, the PE router 4 typically maintains a corresponding VPN Routing and Forwarding (VRF) instance, which includes customer-specific routing information for the VPN. In general, each attachment circuit connecting a PE router (network device 4) and a CE device 7 is associated with a VRF. For any given VPN, the PE router (network device 4) learns routes for the VPN, in some cases from the CE device, and installs the VPN routes to the corresponding VRF, which the PE router uses to forward traffic. Each of the VPN routes may include a service label, such as an MPLS label, that identifies service traffic of the VPN. In addition, the PE router distributes learned VPN routes to other PE routers of the service provider network (or to PE routers of one or more additional service provider networks) using BGP. BGP/MPLS IP VPNs are described in detail in Rosen & Rekhter, "BGP/MPLS IP Virtual Private Networks (VPNs)," Internet Engineering Task Force Network Working Group, Request for Comments 4364, February, 2006, which is incorporated herein by reference in its entirety (hereinafter "RFC 4364").

In the example of system 2, network devices 4 generally represent PE devices of the network 3 that implement VPNs. Network devices 4 (alternatively referred to herein as "PE device 4" or "PE routers 4") typically execute one or more interior gateway protocols, such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP). Network devices 4 are logically located at the "edge" of network 3 and extend attachment circuits to customer edge devices 7 to provide services to one or more customers, including virtual provide network (VPN) services. Moreover, although not shown, each network device 4 may service multiple locally-attached CE devices 7 and customer networks, each having different VPNs and VRFs maintained by network devices 4.

Each of customer edge devices 7A-7B ("customer edge device 7") represents a network device, such as a router, that connects to network 3 via a PE router (network device 4) to receive services of network 3. Each of CE devices 7 may include an Internet Protocol (IP) router, Ethernet switch, Asynchronous Transfer Mode (ATM) switch, Frame Relay switch. CE devices 7 may represent CE devices that are logically part of one or more customer VPNs. CE device 7 may be located at a customer site, or may represent a CE device for a tenant within a data center, for example.

Network devices 4 are members of a path computation domain served by PCE 6. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of network devices 4 may include member routers of multiple ASes. As such, network links connecting network devices 4 may be interior links, inter-AS transport links, or some combination thereof. The techniques may be applicable to any network device that creates dynamic tunnels. Network system 2 may represent a service provider network and, in some examples, include hundreds of routers arranged in various topologies.

Within a single VPN, pairs of PE devices 4 signal one or more logical tunnels for communicating customer traffic through intermediate network 3, where a logical tunnel may include an MPLS label switched path (LSP), Generic Route Encapsulation tunnel, or other suitable logical connection between pairs of PE routers 8 that is capable of encapsulating and transporting packet-based network communications between the PE routers. PE routers 8 may establish tunnels using, e.g., Resource Reservation Protocol (RSVP) or Label Distribution Protocol (LDP).

Although not shown, network 3 typically includes additional infrastructure for routing and switching packets, such as one or more core (P) routers (not shown for ease of illustration), that do not directly connect to any of CE devices 7 but that implement, at least in part, the tunnels that extend between pairs of PE routers 8 for IP-VPNs. The intermediate routers, referred to herein as P routers, may support MPLS LSP or label distribution protocol (LDP) functionality, for instance, but the P routers do not necessarily need to support VPN functionality and are generally unaware of CE devices 7 and the customer traffic encapsulated within the tunnels.

In this way, network devices 4 and network 3 provide VPN services to one or more customers or tenants. To advertise VPN routes for a VPN 17 that includes CE device 7A and CE device 7B, network devices 4A and 4B establish peering session 16 (either directly or via a route reflector—not shown) to internally advertise topology information, e.g., routes, for the VPN 17 to one another. The routes may be referred to as VPN routes, VPN-IP (e.g., VPN-IPv4 or VPN-IPv6), or customer routes and may include routes to the IP networks behind the CE devices 7. Devices that peer with one another using peering sessions 9 are alternatively referred to herein as "peers." Peering session 16 may be a Border Gateway Protocol (BGP) peering session.

Network devices 4 exchange route advertisements, such as BGP UPDATE messages, that include routes for the VPN. In general, a route advertisement associates a prefix with a next hop router for the prefix ("NEXT HOP" in BGP UPDATE messages) and a list of one or more autonomous systems that must be traversed to reach the prefix ("AS PATH" in BGP UPDATE messages). In some cases, the route advertisements may include labeled routes in which a service label is included in association with the VPN routes. The service label may be an MPLS label. When included with traffic for the VPN 17, the service label identifies the traffic as belonging to the VPN. As such, a network device 4 that receives a packet that has the service label at the top of the stack, the network device 4 pops the stack and delivers the packet to the customer edge device 7 that belongs to the VPN 17.

Network device 4A establishes a dynamic tunnel 19 to network device 4B. Network device 4A is the tunnel source for dynamic tunnel 19, and network device 4B is the tunnel destination of dynamic tunnel 19. For example, when network device 4A receives a route advertisement 18 that includes a VPN route to a next hop address associated with network device 4B and a service label to be used for VPN 17, network device 4A may establish dynamic tunnel 19 to carry the VPN traffic across the network 3 to network device 4B. Network device 4A may establish dynamic tunnel 19 in response to determining there is no existing LSP from network device 4A to network device 4B. As another example, if dynamic tunnel 19 exists at the time network device 4A receives the route advertisement 18, network device 4A may add VPN 17 with the service label to the dynamic tunnel 19 such that network device 4A uses dynamic tunnel 19 to transport traffic for VPN 17. Dynamic tunnel 19 creation may be triggered in the routing protocol next-hop resolution process.

The dynamic tunnel 19 may be, for example, a Generic Routing Encapsulation (GRE) tunnel or User Datagram Protocol (UDP) tunnel, which are examples of types of tunnels and correspond to these tunnel types. In cases in which the service label is an MPLS label, these instances of dynamic tunnel 19 are MPLS-over-GRE or MPLS-over-UDP, respectively (also referred to as MPLSoGRE or MPLSoUDP or as MPLS-in-GRE or MPLS-in-UDP). Other tunnel types include GRE, VXLAN, VXLAN-GPE, NVGRE, IP-in-IP, as examples. Network device 4A may use dynamic tunnel 19 to transport traffic having multiple different service labels. An example implementation of MPLS-over-UDP is described in "Encapsulating MPLS in UDP,"

Network Working Group of the Internet Engineering Task Force, Request for Comments 7510, April 2015, which is incorporated by reference in its entirety. An example implementation of MPLS-over-GRE is described in "Encapsulating MPLS in IP or Generic Routing Encapsulation (GRE)," Network Working Group of the Internet Engineering Task Force, Request for Comments 4023, March 2005, which is incorporated by reference in its entirety.

In some cases, network devices 4 may represent PE devices connected by an MPLS core network for a data center architecture. Network devices 4 may operate as local data center gateways. Virtual routers executing on servers of the data center may also operate as PE devices. Pairs of these PE devices may establish dynamic tunnels, such as dynamic tunnel 19, to transport application traffic between the pairs operating as tunnel endpoints for the dynamic tunnels. MPLSoUDP may be a preferable option in this architecture, over MPLSoGRE, because the source port value in the MPLSoUDP tunnel encapsulation header may be generated based on fields in the packets being transported. As a result, routers of the network connecting the tunnel endpoints can load balance traffic using a hash value computed from at least the source port value in the MPLSoUDP tunnel encapsulation header. Examples of a data center architecture in which virtual routers and switching/routing device establish overlay networks are described in PCT/US2013/044378, published as WO2013/184846 on Dec. 12, 2013, which is incorporated by reference herein in its entirety.

In some cases, route advertisement 18 may specify a tunnel type. For example, route advertisement 18 may include a Tunnel Encapsulation attribute or an encapsulation extended community attribute that specifies a tunnel type. The tunnel type identifies the type of tunnel for dynamic tunnel 19. Network device 4A may establish the dynamic tunnel 19 according to the specified tunnel type.

In some cases, network device 4B may establish a separate dynamic tunnel in the reverse direction as dynamic tunnel 19 (i.e., from network device 4B to network device 4A) to enable bidirectional communication for VPN 17 between network devices 4 and, by extension, customer devices 7.

In this situation, PCE 6 has not initiated the configuration of dynamic tunnel 19 in network 3 (and more particularly in network device 4A) and, therefore, may be unaware of the existence of dynamic tunnel 19 for transporting traffic between CE device 7A and CE device 7B. Moreover, in some cases, dynamic tunnel 19 may differ from a label switched path in that dynamic tunnel 19 does not use, for transporting packets from network device 4A to network device 4B, an MPLS transport label or other label as a transport label that is label swapped through network 3. In other words, intermediate routers of network 3 do not necessarily switch MPLS labels of an MPLS label stack for packets transported by dynamic tunnel 19 and instead route the tunnel packets to network device 4B using a non-MPLS outer header. That is, packets traversing dynamic tunnel 19 may have an MPLS label stack of one or more MPLS labels as service labels, e.g., in a tunnel encapsulation header, but may also include a non-MPLS outer header. For cases in which dynamic tunnel 19 is a MPLSoUDP or MPLSoGRE tunnel, network 3 uses IP routing to route traffic for VPN 17 on a shortest path to network device 4B. In this case, dynamic tunnel 19 may be an IP tunnel that transports packets having an outer IP header that includes a destination network address for network device 4B and, possibly, an inner MPLS stack of one or more VPN service labels. Dynamic tunnel 19 may transport packets having a tunnel encapsulation header that includes the service label and may include a GRE or UDP header, for instance. In data center architectures, as described above, there are typically multiple equal-cost paths from network device 4A to network device 4B over which intermediate network devices of network 3 can load balance the traffic for VPN 17.

In general, PCE 6 uses traffic engineering and LSP state information learned from network devices 4 to apply constraints to compute network paths for MPLS traffic engineering LSPs (TE LSPs) both in response to requests from any of network devices 4 and autonomously. In some cases, PCE 6 is an application or other process executing on, for instance, a network node such as one of network devices 4, a component of a network node, an in-network or out-of-network server, or a software-defined networking (SDN) controller. PCE 6 may alternatively be referred to as an SDN controller or controller responsible for managing an overlay network for a software-defined network, where the controller includes PCE functionality. To obtain traffic engineering information for storage in a traffic engineering database (not shown in FIG. 1), PCE 6 may execute one or more network routing protocols, extended to carry traffic engineering information, to listen for routing protocol advertisements that carry such traffic engineering information. PCE 6 computes paths for TE LSPs by applying bandwidth and other constraints to learned traffic engineering information, using one or more path computation algorithms such as Dijkstra, Bellman-Ford, Kruskal, etc. A resulting path may be confined to a single domain or may cross several domains. Additional details regarding an SDN controller that includes a path computation element are found in U.S. patent application Ser. No. 14/042,614, filed Sep. 10, 2013 and entitled "Software-defined Network Controller;" in U.S. patent application Ser. No. 13/843,500, filed Mar. 15, 2013 and entitled "Physical Path Determination for Virtual Network Packet Flows;" U.S. patent application Ser. No. 14/500,736, filed Sep. 29, 2014; and PCT International Patent Application PCT/US13/44378, filed Jun. 5, 2013; each of which is incorporated herein by reference in its entirety.

Network devices 4A-4B include respective path computation clients 8A-8B, 8E ("PCCs 8") that communicate using a corresponding one of extended PCE communication protocol (PCEP) sessions 12A-12B. Reference herein to a PCC may additionally refer to router or other network device that includes the PCC. Each of PCCs 8 is an application or other process executed by the network device that establishes a PCEP session 12. PCCs 8 may use PCEP sessions 12 to request path computation from PCE 6 or otherwise operate to implement techniques described in this disclosure. A PCEP session 12 may operate over Transport Control Protocol (TCP) using a well-known port.

In some cases, network devices 4 may be configured with TE LSPs. A network device 4 may compute a path for a configured TE LSP and signal the TE LSP in network system using a resource reservation protocol, such as Resource Reservation Protocol with Traffic Engineering extensions (RSVP-TE), to reserve resources along the computed path and establish TE LSPs to carry traffic mapped to the LSPs. In some cases, any of PCCs 8 for a network device 4 configured with a TE LSP may issue, via PCEP sessions 12, a path computation request to PCE 6 for the TE LSP. For each requested TE LSP, the path computation request may include a required bandwidth, a setup/holding priority, the source and destination network addresses, delegation, administration flags, administrative data, and metric data. PCE 6 may reply with a computed path for a requested TE LSP when the PCE 6 determines a path using the learned traffic information that satisfies the constraints.

Upon receiving a response from PCE 6, the network device 4 uses a resource reservation protocol to signal the TE LSP along the computed path. Additional details regarding PCEP may be found in "Path Computation Element (PCE) Communication Protocol (PCEP)," Network Working Group, Request for Comment 5440, March 2009 (hereinafter, "RFC 5440"); and "Path Computation Element Communication Protocol (PCEP) Extensions for Stateful PCE," Internet Engineering Task Force, Request for Comments 8231, September 2017 (hereinafter, "RFC 8231"); which are incorporated herein by reference in their respective entireties. Additional details regarding RSVP-TE may be found in "RSVP-TE: Extensions to RSVP for LSP Tunnels", Network Working Group, Request for Comments 3209, December 2001; "Resource ReSerVation Protocol (RSVP)," Network Working Group, Request for Comments 2205, September 1997; which are each incorporated herein by reference in their respective entireties.

For instance, network device 4A may establish a TE LSP (not shown) to network device 4B. In various examples, network system 2 may include any number of TE LSPs connecting different pairs of network devices of network 3. To establish the TE LSP in this example, network device 4A as the ingress LER for the TE LSP uses an LSP signaling protocol, such as RSVP-TE. Network device 4A sends an LSP label request path signaling message that is forwarded along a requested path to request that network devices 4 along the requested path bind labels for the TE LSP. In response, each network device 4 along the requested path binds a label for the TE LSP and sends a LSP label reservation path signaling message to the upstream router that includes the label bound by the router for TE LSP 14. Each type of LSP signaling message includes at least one route object that indicates a path taken by the TE LSP being signaled.

The RSVP-TE Path message (hereinafter, "Path message") is an LSP label request path signaling message for the RSVP-TE LSP signaling protocol. The RSVP-TE Resv message (hereinafter, "Resv message") is an LSP label reservation path signaling message for RSVP-TE. Other LSP signaling protocols may be used.

If network device 4A signals a TE LSP, PCC 8A may send, in an LSP path report message, an indication of the path taken by the TE LSP to PCE 6 via PCEP session 12A. The LSP path report message may represent a PCEP Path Computation State Report (PCRpt) message that includes the indication of the actual path of the TE LSP. The indication of the actual path may be encoded in an RRO.

Unlike the mechanisms for reporting TE LSPs or other LSPs, PCEP does not include mechanisms for reporting dynamic tunnels established as described herein and used to provide customer services over a network, the dynamic tunnels beings instead of LSPs at least in some circumstances.

In accordance with techniques described herein, network device 4A or network device 4B may report creation of and/or deletion of dynamic tunnel 19 to PCE 6 using the techniques described herein. For example, in response to establishing dynamic tunnel 19 or in response to adding a new VPN service to be transported by existing dynamic tunnel 19, network device 4A sends a dynamic tunnel report message 16 to PCE 6 that indicates one or more properties of dynamic tunnel 19.

Dynamic tunnel report message 16 may conform to a PCE communication protocol (PCEP) that has been extended as described herein to support dynamic tunnel report messages that includes tunnel description data for dynamic tunnel 19. Example tunnel description data for a dynamic tunnel 19 may include a tunnel identifier (Tunnel-ID) that uniquely identifies dynamic tunnel 19 for a PCEP session 12, a source address (the network address of network device 4A), a destination address (the network address of network device 4A), operational status, a metric, a tunnel type, and a service label. In some cases, the PCEP Path Computation State Report (PCRpt) message is extended to include a dynamic tunnel object ("Dynamic-Tunnel") that includes at least some of the tunnel description data. As already noted, PCC 8A may generate and send the dynamic tunnel report message 16 to advertise dynamic tunnel 19 to the PCE to affect the path computation and thus placement within the network 3 of LSPs having paths computed by PCE 6.

The techniques may provide one or more technical advantages. For example, by enabling reporting of dynamic tunnel 19 to the PCE 6, the techniques may improve the visibility of the PCE 6 into network 3. With access to additional data descriptive of tunnels configured in the network, in this case dynamic tunnel 19, the PCE 6 may more intelligently configure label switched paths to transport traffic in a manner that improves the efficiency of overlays in the network 3. This technical advantage may be particularly advantageous within a data center context, in which many thousands of tunnels are configured to transport service traffic between nodes. In this way, the techniques may facilitate improved optimization of path computation by the PCE 6 using the dynamic tunnel description data.

Figure 2:
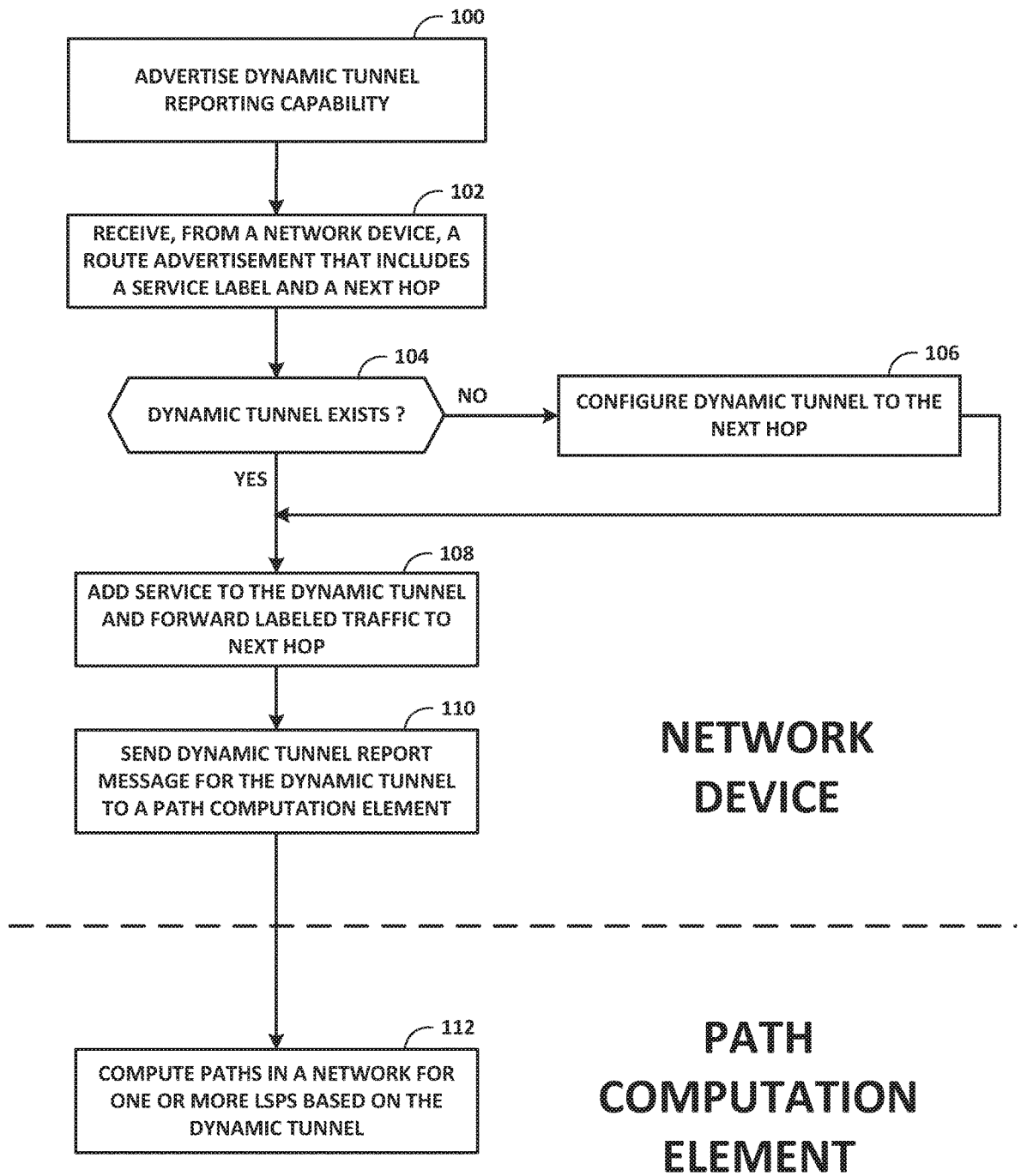
FIG. 2 is a flowchart illustrating an example mode of operation for a network device according to techniques described in this disclosure.

FIG. 2 is a flowchart illustrating an example mode of operation for a network device according to techniques described in this disclosure. The techniques are described with respect to network device 4A and PCE 6 of network system 2 of FIG. 1 but may be performed by any router/network device in the case of network device 4A or PCE/controller in the case of PCE 6.

Initially, network device 4A and PCE 6 advertise their support for dynamic tunnel report capabilities (100). That is, network device 4A sends PCE 6, via PCEP session 12A, an indication that network device 4A is capable of reporting dynamic tunnels, e.g., by generating and sending dynamic tunnel report messages, while PCE 6 sends network device 4A, via PCEP session 12A, an indication that PCE 6 is capable of processing dynamic tunnel report messages.

In some examples, the PCE 6 or PCC 8A of network device 4A as PCEP speakers advertise support of dynamic tunnel report capability during the PCEP session 12A initialization phase. A PCEP speaker includes the "STATEFUL-PCE-CAPABILITY TLV," described in Section 7.1.1 of RFC 8231, in the OPEN object to advertise its support for PCEP Stateful PCE extensions. According to techniques described in this disclosure, in some examples, the STATEFUL-PCE-CAPABILITY TLV is extended to include a Dynamic Tunnel Report flag in the Flags field, where the Dynamic Tunnel Report flag indicates whether the PCEP speaker supports dynamic tunnel report capability.

In some examples, the Dynamic Tunnel Report flag ("DYNAMIC-TUNNEL-REPORT") is a 1-bit that, if set to 1 by a PCC, indicates that the PCC is willing to send Dynamic Tunnel State Reports whenever dynamic tunnel state changes. If set to 1 by a PCE, the Dynamic Tunnel Report flag is indicates that the PCE is interested in receiving Dynamic Tunnel State Reports whenever dynamic tunnel state changes.

In some examples, the DYNAMIC-TUNNEL-REPORT Flag must be advertised by both PCC 8A and PCE 6 for dynamic tunnel report messages to be allowed on PCEP session 12A. The dynamic tunnel report capability may be referred to in the alternative as PCRpt messages with a DYNAMIC-TUNNEL-REPORT extension.

Network device 4A receives, from network device 4B, a route advertisement that includes a service label and a next hop indicating network device 4B is a next hop for prefixes included in the route advertisement (102). In response to receiving the route advertisement 18, if dynamic tunnel 19 is not configured within network device 4A (NO branch of 104), network device 4A configures dynamic tunnel 19 to network device 4B and adds the service to the dynamic tunnel (106). If, however, dynamic tunnel 19 is already configured within network device 4A (YES branch of 104), network device 4A may add the service corresponding to the service label to the dynamic tunnel 19 (108). To add the service, network device 4A may add a new interface or may add a next-hop instruction without creating a logical tunnel interface, which may provide a scaling advantage for the number of dynamic tunnels that can be created on network device 4A. Based on the service for received traffic from customer edge device 7A, network device 4A may apply the corresponding service label to traffic before forwarding the labeled traffic via dynamic tunnel 19 (108).

In response to configuring the dynamic tunnel 19 or adding the service to the dynamic tunnel 19, network device 4A sends a dynamic tunnel report message 16 to PCE 6 (110). As described in further detail below with respect to FIG. 3, the dynamic tunnel report message 16 may be a PCRpt message extended from RFC 8231 Section 6.1 to include dynamic tunnel description data. PCE 6 receives the dynamic tunnel report message 16 and performs at least one operation based on the tunnel description data therein. For example, PCE 6 may compute paths in network 3 for one or more LSPs based on the tunnel description data included in the dynamic tunnel report message 16 reporting dynamic tunnel 19, where the one or more LSPs are used to transport other network packets within network 3 that are not transported via the dynamic tunnel 19 (112). For example, dynamic tunnel 19 and one or more LSPs having paths through network 3 computed by PCE 6 using tunnel description data for dynamic tunnel 19 may co-exist in network 3. In this way, knowledge of the existence of dynamic tunnel 19, and the bandwidth impact of dynamic tunnel 19, may advantageously allow PCE 6 to improve traffic engineering and path computation for LSPs within network 3, especially in situations where dynamic tunnel 19 is a non-MPLS tunnel of which PCE 6 is unaware.

Figure 3:
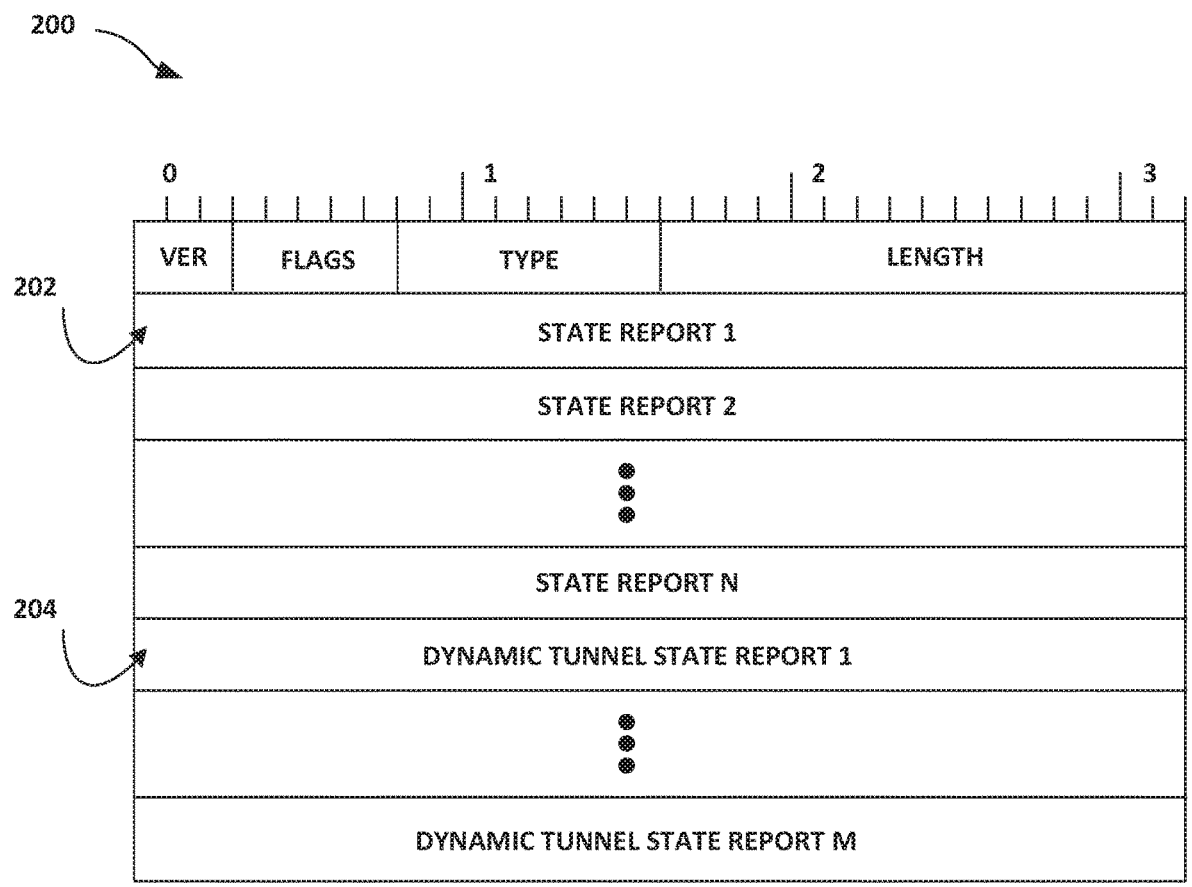
FIG. 3 is a block diagram illustrating an example format for a path computation state report ("PCRpt") message that facilitates reporting of dynamic tunnels according to techniques described in this disclosure.

FIG. 3 is a block diagram illustrating an example format for a path computation state report ("PCRpt") message that facilitates reporting of dynamic tunnels according to techniques described in this disclosure. In RFC 8231, PCRpt messages are referred to as Path Computation State Report messages, but this disclosure refers to PCRpt messages to encompass dynamic tunnels in addition to LSPs. PCRpt message 200 may represent an example of dynamic tunnel report message 16 of FIG. 1, for example. PCRpt message 200 may represent a PCEP PCRpt message modified according to techniques described herein to report a dynamic tunnel 19 to PCE 6.

PCRpt message 200 includes the common header for PCEP defined in RFC 5440. This common header specifies the PCEP version number ("VER"), currently defined common flags ("FLAGS"), the message type ("TYPE"), and the message length ("LENGTH") that specifies the total length of PCRpt message 200 in bytes, including the common header. The message type field of PCRpt message 200, declares to the recipient that the message is of type "PCRpt." The message type value may be 8 in some instances to indicate type "PCRpt." The PCRpt is extended to report the status of one or more dynamic tunnels in addition to or in the alternative to reporting the status of one or more LSPs.

The format of the PCRpt message 200 may be modified from Section 6.1 of RFC 8231 as follows:
<PCRpt Message>::=<Common Header>
<state-report-list>
<dynamic-tunnel-list>

PCRpt message 200 may include zero or more state reports (<state-report-list>) for respective TE LSPs, described hereinafter with respect to state report 202 (illustrated as "STATE REPORT 1"). State report 202 includes an LSP object and indicates an actual path taken by the TE LSP being reported by the state reports. State report 202 may include an RRO object to indicate the actual path for the reported TE LSP and optionally includes LSPA, BANDWIDTH, METRIC, as defined in RFC 5440. The LSP attributes (LSPA) object specifies various TE LSP attributes. The BANDWIDTH object specifies a bandwidth for the TE LSP. The METRIC object may specify the metric that has been optimized for the TE LSP (e.g., an IGP metric, a TE metric, hop counts).

PCRpt message 200 may include zero or more dynamic tunnel state reports (<dynamic-tunnel-list>), described hereinafter with respect to dynamic tunnel state report 204 (illustrated as "DYNAMIC TUNNEL STATE REPORT 1"). Dynamic tunnel state report 204 includes a Dynamic-Tunnel object, described more fully with respect to FIG. 4. Dynamic tunnel state report 204 may also include a Metric Object, similar to that defined in RFC 5440. The metric type of the Metric Object may be set to 1 to signify IGP metric.

Instances of PCRpt message 200 may zero or more instances of state reports and zero or more instances of dynamic tunnel reports.

Figure 4:
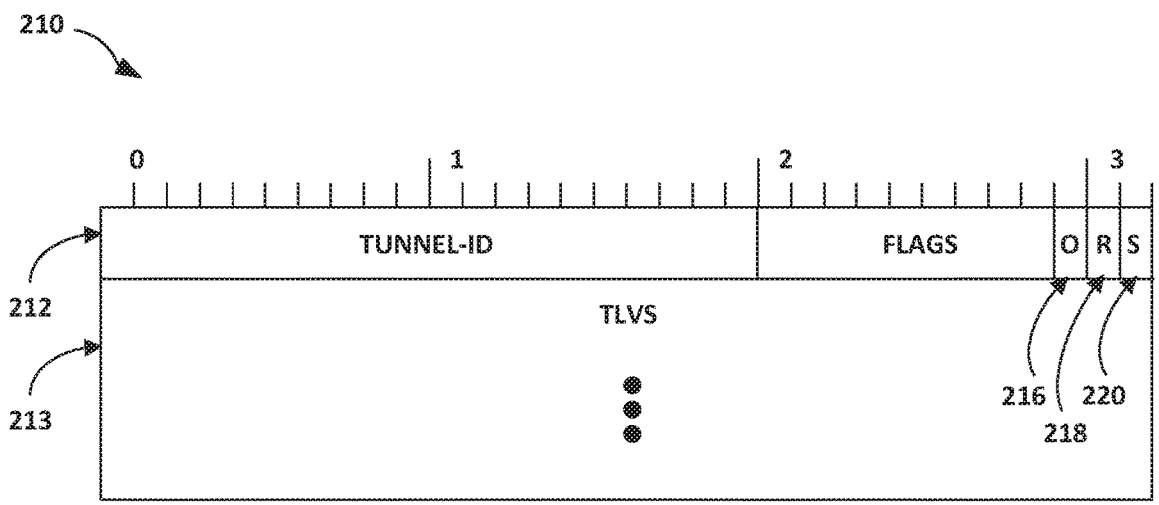
FIG. 4 is a block diagram illustrating an example format for a Dynamic-Tunnel object carried by a PCRpt message and more particularly, in some examples, by a dynamic tunnel state report included in a PCRpt message, according to techniques of this disclosure.

FIG. 4 is a block diagram illustrating an example format for a Dynamic-Tunnel object carried by a PCRpt message and more particularly, in some examples, by a dynamic tunnel state report included in a PCRpt message, according to techniques of this disclosure. The Dynamic-Tunnel object may be present within PCRpt messages while reporting a dynamic tunnel. The Dynamic-Tunnel object may contain a set of fields used to indicate tunnel description data of the target dynamic tunnel and in some cases the operation to be performed on the target dynamic tunnel. The Dynamic-Tunnel object may also include a flag indicating to a PCE that the Dynamic-Tunnel Synchronization is in progress. A dynamic tunnel may include those that operate over UDP or GRE. Dynamic tunnel Object-Class and Dynamic tunnel Object-Type are to be determined, but may be used in the Common Object Header defined in Section 7.2 of RFC 5440 to identify the Dynamic-Tunnel object 210 as a Dynamic-Tunnel object (in contradistinction to an LSP object or (Stateful PCE Request Parameters) SRP object, for instance).

Dynamic-Tunnel object 210 includes TUNNEL-ID field 212 that specifies a tunnel identifier of the target dynamic tunnel for the dynamic tunnel report (e.g., dynamic tunnel report 204) that includes Dynamic-Tunnel object 210. TUNNEL-ID field 212 is a per-PCEP session identifier for the target LSP. That is, for each of its PCEP sessions, a PCC creates a unique tunnel identifier for each dynamic tunnel that is constant for the lifetime of a PCEP session. The PCC will advertise the same tunnel identifier on all PCEP sessions it maintains at a given time. At least in some cases, there is no name associated with a dynamic tunnel, and thus no mapping between the tunnel identifier and tunnel name is maintained. If needed, PCE 6 can maintain mapping of the tunnel identifier with source and destination of a dynamic tunnel, for one or more of the dynamic tunnels. Subsequent PCRpt messages may then address the target dynamic tunnel by its tunnel identifier, which is specified by TUNNEL-ID field 212 of Dynamic-Tunnel object 210.

Dynamic-Tunnel object 210 may also include an operational ("O") flag 216, remove ("R") flag 218, and SYNC ("S") flag 220. The SYNC flag may be set to 1 on each PCRpt message sent from a PCC during State Synchronization. The SYNC flag may be set to 0 in other messages sent from the PCC. The remove flag 218 when set indicates that the dynamic tunnel identified by TUNNEL-ID field 212 has been removed from the PCC sending the PCRpt 200 and the receiving PCE 6 should remove all state from its database. Upon receiving an Dynamic Tunnel State Report 204 having a Dynamic-Tunnel object 210 with the R flag set to 1 for a dynamic tunnel, the PCE should remove all state for the tunnel described by the IPV4-TUNNEL-IDENTIFIERS TLV, which is described below with respect to FIG. 5. The operational flag 216 represents an operational state of the dynamic tunnel. The following values are defined: 0—DOWN (not active), 1—UP (signaled), 2—ACTIVE (up and carrying traffic), and 3-7—Reserved (reserved for future use). TLVs field 213 of Dynamic-Tunnel object 210 may include one or more Type-Length-Value items, such as the IPV4-TUNNEL-IDENTIFIERS TLV.

Figure 5:
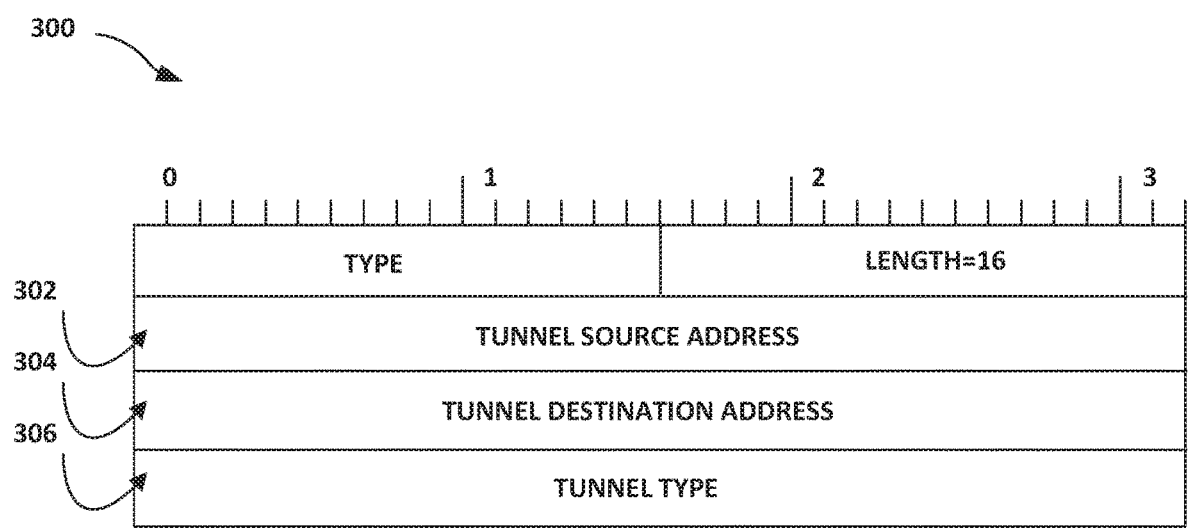
FIG. 5 is a block diagram illustrating an example format for a tunnel identifiers object carried by a PCRpt message and more particularly, in some examples, by a Dynamic-Tunnel object included in a dynamic tunnel state report included in a PCRpt message, according to techniques of this disclosure.

FIG. 5 is a block diagram illustrating an example format for a tunnel identifiers object carried by a PCRpt message and more particularly, in some examples, by a Dynamic-Tunnel object included in a dynamic tunnel state report included in a PCRpt message, according to techniques of this disclosure. The tunnel identifiers object may contain a set of fields used to indicate tunnel description data of the target dynamic tunnel and in some cases the operation to be performed on the target dynamic tunnel. In this example, tunnel identifiers object 300 is a TLV having a tunnel source address field 302 to indicate a tunnel source address (e.g., an IPv4 address), a tunnel destination address field 304 to indicate a tunnel destination address (e.g., an IPv4 address), and a tunnel type field 306 to indicate the tunnel type (e.g., MPLSoGRE, MPLSoUDP, or another tunnel type. Each of these fields indicates a corresponding property of a dynamic tunnel being reported with a PCRpt message.

Figure 6:
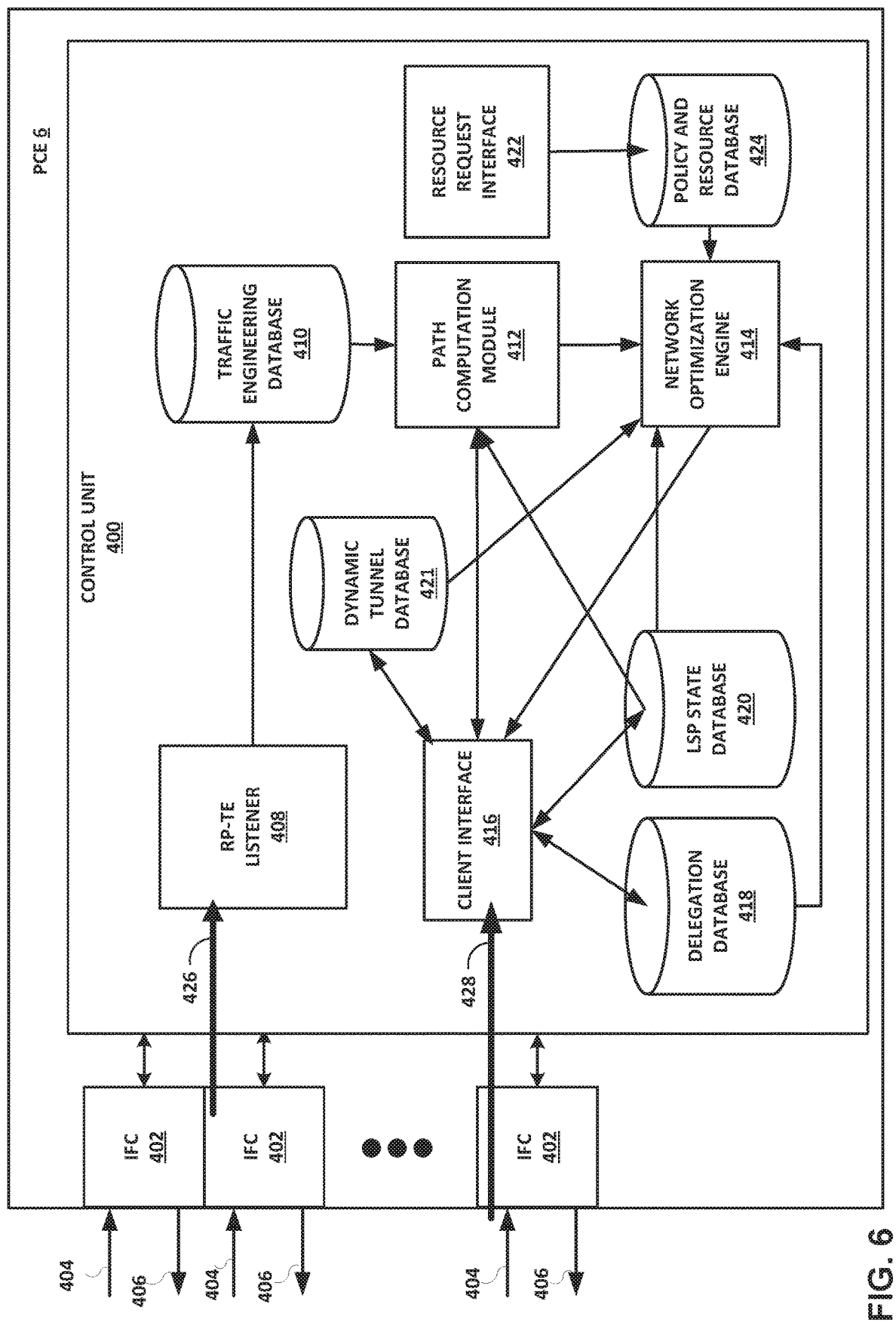
FIG. 6 is a block diagram illustrating an example instance of a stateful path computation element that establishes and uses PCEP sessions to receive dynamic tunnel report messages and compute one or more paths within the network based on the dynamic tunnel report messages, according to techniques described in this disclosure.

FIG. 6 is a block diagram illustrating an example instance of a stateful path computation element that establishes and uses PCEP sessions to receive dynamic tunnel report messages and compute one or more paths within the network based on the dynamic tunnel report messages, according to techniques described in this disclosure. Stateful PCE 6, in this example, includes control unit 400 coupled to interface cards 402 ("IFCs 402") for receiving packets via input links 404 ("input links 44") and sending packets via output links 406 ("output links 406").

Control unit 400 may comprise one or more processors (not shown in FIG. 6) that execute software instructions, such as those used to define a software or computer program, stored to a computer-readable storage medium, such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 400 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing protocol with traffic engineering extensions listener 408 ("RP-TE listener 408") is a process of control unit 408 that executes one or more routing protocols extended to advertise and receive traffic engineering (TE) information 426. RP-TE listener 408 may in some instances be a passive listener and eschew routing protocol advertisements. RP-TE 408 may, for example, execute Intermediate System-to-Intermediate System with TE extensions (IS-IS-TE) or Open Shortest Path First with TE extensions (OSPF-TE). In some instances, RP-TE listener 408 executes Border Gateway Protocol to receive advertised TE information for inter-AS and other out-of-network links. Additional details regarding an example PCE 6 are found in U.S. patent application Ser. No. 14/042,614, referenced above.

Traffic engineering information received by RP-TE listener 408 includes topology information for the path computation domain served by PCE 6. Such TE information includes one or more of the link state, administrative attributes, and metrics such as bandwidth available for use at various LSP priority levels of links connecting routers of the domain. RP-TE listener 408 stores TE information in traffic engineering database (TED) 410, which is stored by a computer-readable storage medium for use in path computation.

Client interface 416 of control unit 400 implements PCE communication protocol (PCEP) to receive and send PCEP messages described in this disclosure. That is, client interface 416 establishes PCEP sessions with one or more path computation clients (PCCs) network devices in the network. Via the PCEP sessions, client interface 416 receives dynamic tunnel state reports 428 that include up-to-date dynamic tunnel state including dynamic tunnel description data for dynamic tunnels, which client interface 416 stores to dynamic tunnel database 421. Dynamic tunnel state reports 428 may be included in PCRpt messages, as described above with respect to FIGS. 3-5. This may increase the number of tunnels in the PCE 6 path computation domain, e.g., network 3, known to PCE 6 and improve path optimization by PCE 6 in its path computation domain.

Client interface 416 may also receive LSP state reports that include up-to-date state for LSPs, which client interface 416 stores to LSP state database 420. State for an LSP may include, for example, the LSP status (e.g., up/down), symbolic name for inter-PCEP session persistence, LSP attributes such as setup priority and hold priority, number of hops, the reserved bandwidth, a metric that has been optimized for the TE LSP (e.g., an IGP metric, a TE metric, or hop counts), and an actual path followed by the TE LSP.

LSP state reports received by client interface 416 may in some case include a delegation that provides access rights to PCE 6 to modify parameters of the target TE LSP. In some instances, the delegation may specify the particular parameters of the target TE LSP that are exposed for modification. Client interface 416 stores such delegation information to delegation database 418, which may associate the delegation information with LSP identifiers that also identify TE LSPs in LSP state database 420. Client interface 416 may also implement functionality for the operation of PCEP to facilitate path computation request/reply messages.

Resource request interface 422 of control unit 400 provides an interface by which applications and/or operators may request TE LSPs having particular characteristics, such as source/destination and guaranteed bandwidth. Applications and operators may also use resource request interface 422 to inspect LSP state information and modify parameters of LSPs identifiable by their respective symbolic names. For example, PCE 6 may receive via resource request interface 422 a resource request message from an application that identifies an LSP by its symbolic name. In response, resource request interface 422 returns an indication of LSP state information for the identified LSP to the application for use by the application to transport application traffic. Resource request interface 422 stores resource requirements corresponding to the requests in policy and resource database 424, which may also store policies that determine the operation of PCE 6, in particular of network optimization engine 414, upon the occurrence of specified conditions.

Network optimization engine 414 executing on control unit 400 uses dynamic tunnel state stored to dynamic tunnel database 421 and may in some cases further use one or more of TE information of TED 410, LSP state information stored to LSP state database 420, and/or delegation information stored to delegation database 418 to compute respective paths for one or more LSPs that further normative goals of the network operator, which may be expressed in policy and resource database 424. Such goals may include maximizing total throughput and/or fostering bandwidth allocation fairness for requested resources, for instance. Network optimization engine 414 may invoke path computation module 412 of control unit, executes constrained SPF (CSPF) using supplied constraints to determine a set of paths that satisfy the constraints. LSP state information stored to LSP state database 420 may supply constraints and link metrics to path computation module 412 for both passive stateful and active stateful instances of PCE 6.

Although described as databases, databases 418, 421, 424, 410, and 421 may represent other data structures, such as files, tables, lists, trees, etc.

Figure 7:
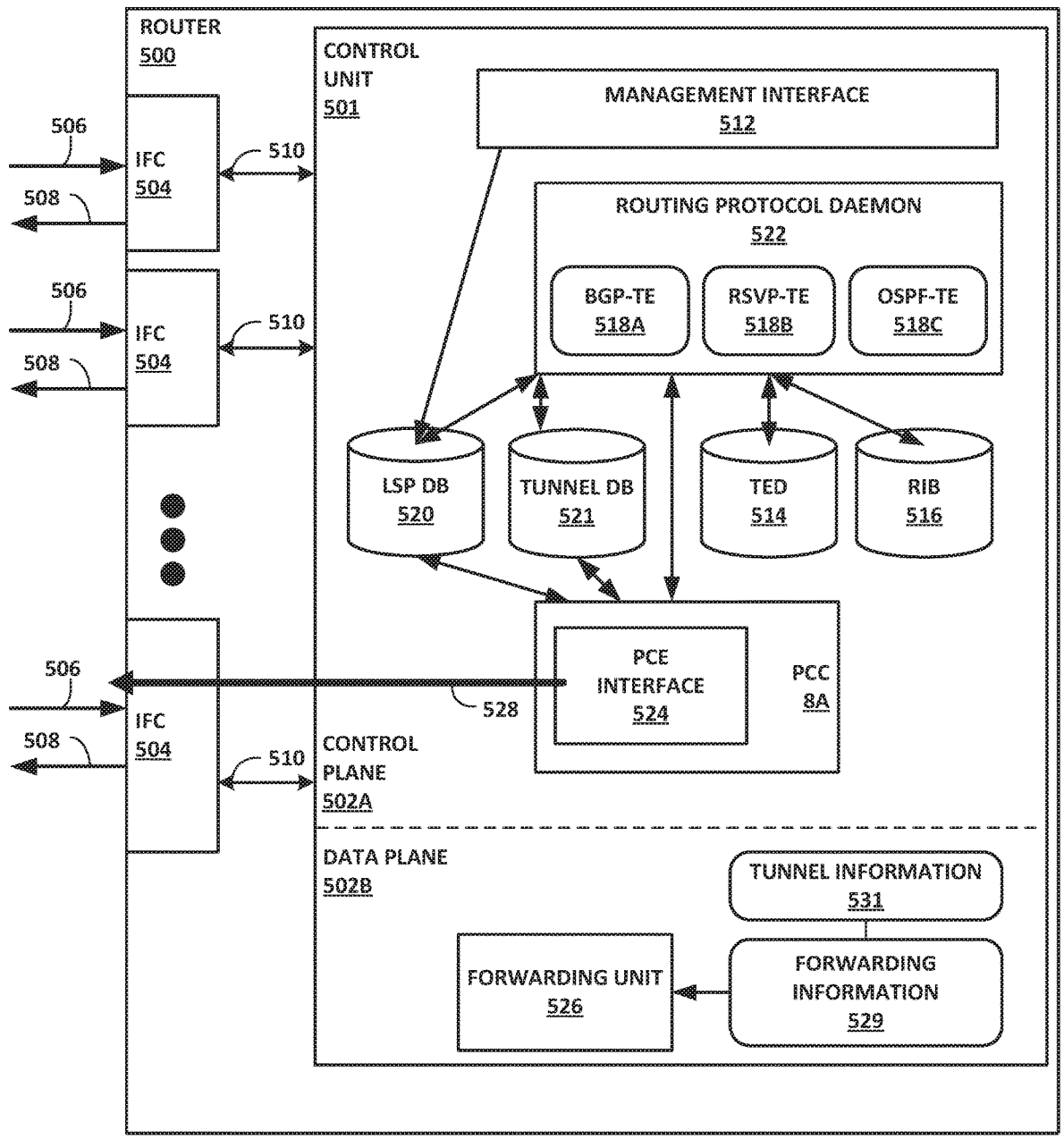
FIG. 7 is a block diagram illustrating an example router that sends indications of actual paths for TE LSPs to a path computation element in accordance with techniques described in this disclosure.

FIG. 7 is a block diagram illustrating an example router that sends indications of actual paths for TE LSPs to a path computation element in accordance with techniques described in this disclosure. For purposes of illustration, router 500 may be described below within the context of an exemplary network system 2 of FIG. 1 and may represent any one of network devices 4. Moreover, while described with respect to a particular network device, e.g., a router, the techniques may be implemented by any network device that establishes dynamic tunnels.

Router 500 includes a control unit 501 and interface cards (IFCs) 504 coupled to control unit 501 via internal links 510. Control unit 501 may include one or more processors (not shown in FIG. 7) that execute software instructions, such as those used to define a software or computer program, stored to a computer-readable storage medium (again, not shown in FIG. 7), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 501 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 501 is divided into two logical or physical "planes" to include a first control or routing plane 502A ("control plane 502A") and a second data or forwarding plane 502B ("data plane 502B"). That is, control unit 501 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 502A of control unit 501 executes the routing functionality of router 500. In this respect, control plane 502A represents hardware or a combination of hardware and software of control unit 501 that implements, in routing protocol daemon (RPD) 522, protocols 518 by which routing information stored in routing information base 516 ("RIB 516") may be determined. RIB 516 may include information defining a topology of a network, such as network 3 of FIG. 1. RPD 522 represents a routing protocol process or application and may resolve the topology defined by routing information in RIB 516 to select or determine one or more routes through the network. RPD 522 may then update data plane 502B with representations of these routes, where data plane 502B maintains these representations as forwarding information 529.

Routing protocols of protocols 518 executed by RPD 522 include, in this example, Border Gateway Protocol with Traffic Engineering extensions (BGP-TE) 518A and Open Shortest Path First with Traffic Engineering extensions (OSPF-TE) 518C. RPD 522 executes these protocols to advertise and receive routing and traffic engineering information from other routers, including autonomous system border routers of external ASes and routers within a routing domain in which network device 4A participates. Various other examples may implement other link-state or vector-distance protocols to exchange traffic engineering with other routers. RPD 522 stores received traffic engineering information in traffic engineering database 514 (illustrated as "TED 514"), which is stored by a computer-readable storage medium. TED 514 may subsume RIB 516 in some instances to store all traffic engineering information in a single data structure. TED 514 may store, for example, one or more of the link state, administrative attributes, and metrics such as bandwidth available for use at various LSP priority levels of links connecting network device 4A to other routers of an MPLS domain.

Forwarding or data plane 502B represents hardware or a combination of hardware and software of control unit 501 that forwards network traffic in accordance with forwarding information 529 that includes network destinations of output links 508 as well as MPLS forwarding information such as LSP label mappings (or "label information base") that associate outbound labels and interfaces to inbound labels received on incoming traffic. Data plane 502B includes a forwarding unit 526 that provides high-speed forwarding of network traffic received by interface cards 504 via inbound links 506 to outbound links 508. Forwarding unit 526 may represent a packet forwarding engine (PFE) coupled to one or more IFCs 504. Further details of one example embodiment of a router can be found in U.S. patent application Ser. No. 12/182,619, filed Jul. 30, 2008, and entitled "STREAMLINED PACKET FORWARDING USING DYNAMIC FILTERS FOR ROUTING AND SECURITY IN A SHARED FORWARDING PLANE," which is incorporated herein by reference.

Control plane 502A further includes management interface 512 by which a network management system or in some instances an administrator using a command line or graphical user interface configures label switched paths described in LSP database 520 (illustrated as "LSP DB 520"). LSP database 520 includes LSP configuration data, for example, an LSP destination, setup/hold priorities, path (e.g., an RRO), metrics, and other LSP attributes such as those described herein. LSP database 520 may also include information designating zero or more attributes of each configured LSP as delegable parameters that may be set/modified by a PCE using PCEP to modify the operation of the LSP when set up in the network. LSP attributes may be divided into three categories: (1) non-delegable parameters that RPD 522 applies immediately via RSVP-TE 518B and are neither re-signaled nor overridden by a PCE, (2) delegable parameters that RPD 522 applies when the LSP is re-signaled due, e.g., to LSP failure, and (3) delegable parameters that may be overridden by a PCE and trigger re-signaling by RPD 522. All delegable LSP parameters may include a configured default value that RPD 522 applies when, for example, a PCEP session terminates, the PCE otherwise becomes unavailable, or the PCE returns a delegation. LSP database 520 may further store path state for TE LSPs for which router 500 is operating as a transit LSR or egress LER.

RPD 522 signals LSPs described in LSP database 520 by executing an LSP signaling protocol, which in this instance is Resource Reservation Protocol with Traffic Engineering extensions (RSVP-TE) 518B, that signals other routers in the network to reserve resources and provide MPLS forwarding information to RPD 522 for use in forwarding MPLS packets. Various instances of router 500 may also, or alternatively, use standard Label Distribution Protocol (LDP) to signal LSPs. In addition, RPD 522 executes protocols 518 to receive traffic engineering information that affects the state of LSPs, such as failed links and preempted resources that may result in a down state for LSPs. RPD 522 may associate such LSP state information with corresponding LSPs in LSP database 520 and may further direct PCC 8A to send one or more LSP state reports to a PCE in response, as described in further detail below.

RPD 522 executes BGP-TE 518A (or in some cases simply BGP) to receive labeled route advertisements. RPD 522 may, in response to receiving a labeled route advertisement, configure a new dynamic tunnel or configure an existing dynamic tunnel to add a service, and store the configuration information for the dynamic tunnel to dynamic tunnel database 521. RPD 522 may then update data plane 502B with representations of the dynamic tunnel, where data plane 502B maintains these representations as tunnel information 531 of forwarding information 529. Although described as databases, databases 520, 521, 514, and 516 may represent other data structures, such as files, tables, lists, trees, etc.

In accordance with techniques of this disclosure, path computation client (PCC) module 8A of control plane 502A mediates communication between RPD 522 and a path computation element. PCC 8A includes PCE interface 524 that implements PCEP to receive and send PCEP messages described in this disclosure. PCE interface 524 also implements functionality for the operation of PCEP to facilitate path computation request/reply messages.

PCE interface 524 establishes PCEP sessions with one or more PCEs and sends, via the PCEP sessions, dynamic tunnel report messages 528 to report dynamic tunnels created by router 500. PCE interface 524 may obtain dynamic tunnel description data for the dynamic tunnels stored to tunnel database 521 and generate dynamic tunnel report messages 528. Dynamic tunnel reports messages 528 may be included in PCRpt messages as dynamic tunnel state reports 204 or may themselves represent PCRpt messages that include one or more dynamic tunnel state reports 204. In this way, PCC 8A reports, to PCE 6, dynamic tunnel description data for extant dynamic tunnels in a network that includes router 500. PCE 6 may use the dynamic tunnel description data to optimize path computation for LSPs in a network and send the computed paths to network devices of the network for provisioning within the network to transport network traffic.

PCE interface 524 may also send, via the PCEP sessions, LSP state reports that include LSP state for TE LSPs described in LSP state information stored by LSP database 520. LSP state reports may be included in PCRpt messages. In this way, PCC 8A synchronizes LSP state between router 500 and the PCEs, including LSP state for TE LSPs for which router 500 is not an ingress LER. LSP state reports may represent example instances of LSP path reports of FIG. 3.

The techniques described herein may be implemented in hardware, software, firmware, or any combination thereof. Various features described as modules, engines, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
a software-defined networking (SDN) controller for a network, the SDN controller comprising a path computation element (PCE) for a path computation domain of a network; and
a network device configured to route network packets within the network, the network device further configured to generate a dynamic tunnel report message that includes dynamic tunnel description data for a dynamic tunnel that transports the network packets through the network, wherein the network packets transported by the dynamic tunnel each comprises an outer header that does not include a multiprotocol label switching (MPLS) transport label, and wherein the network device is further configured to send the dynamic tunnel report message to the SDN controller to report the dynamic tunnel to the SDN controller, and
wherein the SDN controller is configured to compute, based at least on the dynamic tunnel description data, respective paths for one or more label switched paths for transporting other network packets within the network and to send the computed paths to the network for provisioning within the network.

2. The system of claim 1,
wherein, to generate the dynamic tunnel report message, the network device is configured to generate, in response to configuration of or removal of the dynamic tunnel, the dynamic tunnel report message.

3. The system of claim 1,
wherein the network device is configured to configure the dynamic tunnel in response to receipt of a route advertisement that includes a route for a network prefix and a service label for the route,
wherein the network device is configured to generate and output, via the dynamic tunnel, a packet of the network packets, the packet having a tunnel encapsulation header that includes the service label and having an outer header that includes a destination address of a destination tunnel endpoint of the dynamic tunnel.

4. The system of claim 1,
wherein, to generate the dynamic tunnel report message, the network device is configured to generate, in response to configuration of the dynamic tunnel to add a service, the dynamic tunnel report message.

5. The system of claim 1,
wherein the dynamic tunnel comprises either a Multiprotocol Label Switching over Generic Route Encapsulation tunnel or a Multiprotocol Label Switching over User Datagram Protocol tunnel.

6. The system of claim 1,
wherein the dynamic tunnel description data includes a tunnel source address of the dynamic tunnel and a tunnel destination address of the dynamic tunnel.

7. The system of claim 1,
wherein the dynamic tunnel description data includes a tunnel type for the dynamic tunnel.

8. The system of claim 1,
wherein the dynamic tunnel report message comprises a Path Computation Element Protocol (PCEP) Path Computation State Report (PCRpt) message that includes a dynamic tunnel state report for the dynamic tunnel, and wherein sending the dynamic tunnel report message comprises sending, by the network device via a PCEP session with the PCE, the dynamic tunnel report message.

9. The system of claim 8,
wherein the PCRpt message includes a plurality of dynamic tunnel state reports for respective dynamic tunnels configured in the network, the plurality of dynamic tunnel state reports including the dynamic tunnel report message.

10. The system of claim 8,
wherein the PCRpt message includes one or more label switched path (LSP) state reports for respective LSPs configured in the network.

11. The system of claim 8,
wherein the PCRpt message includes a Dynamic-Tunnel object having a set of one or more fields and one or more Type-Length-Value items that, in combination, include the dynamic tunnel description data,
wherein the one or more fields comprise:
a Tunnel-ID field that indicate a tunnel identifier for the dynamic tunnel within the PCEP session;
a set of one or more flags that describe a state for the dynamic tunnel.

12. The system of claim 11, wherein the one or more Type-Length-Value items comprise a IPV4-TUNNEL-IDENTIFIERS Type-Length-Value item that indicates a tunnel source address of the dynamic tunnel, a tunnel destination address of the dynamic tunnel, and a tunnel type of the dynamic tunnel.

13. A method comprising:
generating, by a network device configured to route network packets within a network, a dynamic tunnel report message that includes dynamic tunnel description data for a dynamic tunnel that transports the network packets through the network, wherein the network packets transported by the dynamic tunnel each comprises an outer header that does not include a multiprotocol label switching (MPLS) transport label; and
sending, by the network device, the dynamic tunnel report message to a path computation element (PCE) for a path computation domain to report the dynamic tunnel to the PCE for inclusion in path computation by the PCE for label switched paths of the network.

14. The method of claim 13,
wherein generating the dynamic tunnel report message comprises generating, in response to configuring or removal of the dynamic tunnel, the dynamic tunnel report message.

15. The method of claim 13,
wherein configuring the dynamic tunnel comprises configuring, in response to receiving a route advertisement that includes a route for a network prefix and a service label for the route, the dynamic tunnel, the method further comprising:
generating and outputting, via the dynamic tunnel, a packet of the network packets, the packet having a tunnel encapsulation header that includes the service label and having an outer header that includes a destination address of a destination tunnel endpoint of the dynamic tunnel.

16. The system of claim 13,
wherein generating the dynamic tunnel report message comprises generating, in response to configuration of the dynamic tunnel to add a service, the dynamic tunnel report message.

17. The method of claim 13,
wherein the dynamic tunnel comprises either a Multiprotocol Label Switching over Generic Route Encapsulation tunnel or a Multiprotocol Label Switching over User Datagram Protocol tunnel.

18. The method of claim 13,
wherein the dynamic tunnel description data includes a tunnel source address of the dynamic tunnel and a tunnel destination address of the dynamic tunnel.

19. The method of claim 13,
wherein the dynamic tunnel description data includes a tunnel type for the dynamic tunnel.

20. A network device comprising:
one or more processors coupled to a memory;
a routing protocol daemon configured for execution by the one or more processors to receive a route advertisement that includes a route for a network prefix and a service label for the route,
wherein the routing protocol daemon is further configured to configure a dynamic tunnel that transports network packets through a network, the network packets including the service label for the route, the service label for identifying a service provided by the network, wherein the dynamic tunnel comprises one of a Multiprotocol Label Switching-over-Generic Route Encapsulation (MPLSoGRE) tunnel or a Multiprotocol Label Switching-over-User Datagram Protocol (MPLSoUDP) tunnel; and
a path computation client configured for execution by the one or more processors to generate, in response to configuration of the dynamic tunnel, a dynamic tunnel report message that includes dynamic tunnel description data for the dynamic tunnel,
wherein the path computation client is further configured to send, via a Path Computation Element Protocol (PCEP) session with a software-defined networking (SDN) controller for the network, the dynamic tunnel report message to report the dynamic tunnel to the SDN controller.

21. The network device of claim 20,
wherein the path computation client is configured to send the dynamic tunnel report message to report the dynamic tunnel to the SDN controller for the SDN controller to compute, based at least on the dynamic tunnel description data for the dynamic tunnel, respective paths for one or more label switched paths for transporting other network packets within the network.

* * * * *

UNITED STATES PATENT AND TRADEMARK OFFICE
CERTIFICATE OF CORRECTION

PATENT NO. : 10,630,581 B2
APPLICATION NO. : 16/012524
DATED : April 21, 2020
INVENTOR(S) : Arijit Paul Page 1 of 1

It is certified that error appears in the above-identified patent and that said Letters Patent is hereby corrected as shown below:

Item (54) Title Replace "Dynamic tunnel report for path computation and traffic engineering within a computer network" with --Dynamic tunnel reporting for path computation and traffic engineering within a computer network--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*